United States Patent [19]

Koentges

[11] Patent Number: 4,720,253
[45] Date of Patent: Jan. 19, 1988

[54] PROGRAM-CONTROLLED APPARATUS FOR THE PRODUCTION OF MOLDINGS FROM MULTICOMPONENT PLASTIC, IN PARTICULAR POLYURETHANE

[75] Inventor: Gerhard Koentges, Osnabrueck, Fed. Rep. of Germany

[73] Assignee: Elastogran Maschinenbau GmbH, Strasslach, Fed. Rep. of Germany

[21] Appl. No.: 826,763

[22] Filed: Feb. 6, 1986

[51] Int. Cl.⁴ ............................................. B29C 31/06
[52] U.S. Cl. .................................. 425/145; 264/40.7; 425/150; 425/159
[58] Field of Search ............... 425/145, 147, 150, 159; 264/40.1, 40.7, 40.5

[56] References Cited

U.S. PATENT DOCUMENTS

| | | | |
|---|---|---|---|
| 3,616,495 | 11/1971 | Lemelson | 425/159 X |
| 3,663,139 | 5/1972 | Robbins et al. | 425/159 X |
| 3,677,681 | 7/1972 | Zippel et al. | 264/40.1 X |
| 3,809,516 | 5/1974 | Komaki | 425/150 |
| 4,140,451 | 2/1979 | Herdzina, Jr. et al. | 425/145 X |
| 4,161,380 | 7/1979 | Bishop | 425/145 |
| 4,165,960 | 8/1979 | Lemelson | 425/145 |
| 4,219,317 | 8/1980 | Willmerding | 425/145 |
| 4,421,468 | 12/1983 | Bokelmann | 425/145 X |
| 4,424,015 | 1/1984 | Black et al. | 264/40.1 X |
| 4,448,736 | 5/1984 | Emery et al. | 425/145 X |
| 4,532,093 | 7/1985 | O'Malley et al. | 425/145 X |
| 4,571,319 | 2/1986 | Baluch et al. | 264/40.1 |

FOREIGN PATENT DOCUMENTS 1916329  6/1972  Fed. Rep. of Germany .

Primary Examiner—Richard L. Chiesa
Attorney, Agent, or Firm—Keil & Weinkauf

[57] ABSTRACT

The apparatus for the production of moldings, preferably of polyurethane, possesses a conveyor, which is preferably a continuous conveyor in the form of a rotary table (2), on which exchangeable molds (3) to be filled are arranged. A mixing apparatus having a mixing head (8) is provided for filling the molds, and a mold release station (5) is also present. Each mold (3) has a plug (10) which connects it to the program control unit (1) and whose contacts are set so that they select, by means of an appropriate code, the program assigned to this code. A decoder (6) translates this code and determines the corresponding program. This avoids incorrect operation as a result of incorrect program selection. Each mold determines its program itself by means of the coding at the contacts of its plug.

1 Claim, 1 Drawing Figure

U.S. Patent   Jan. 19, 1988   4,720,253
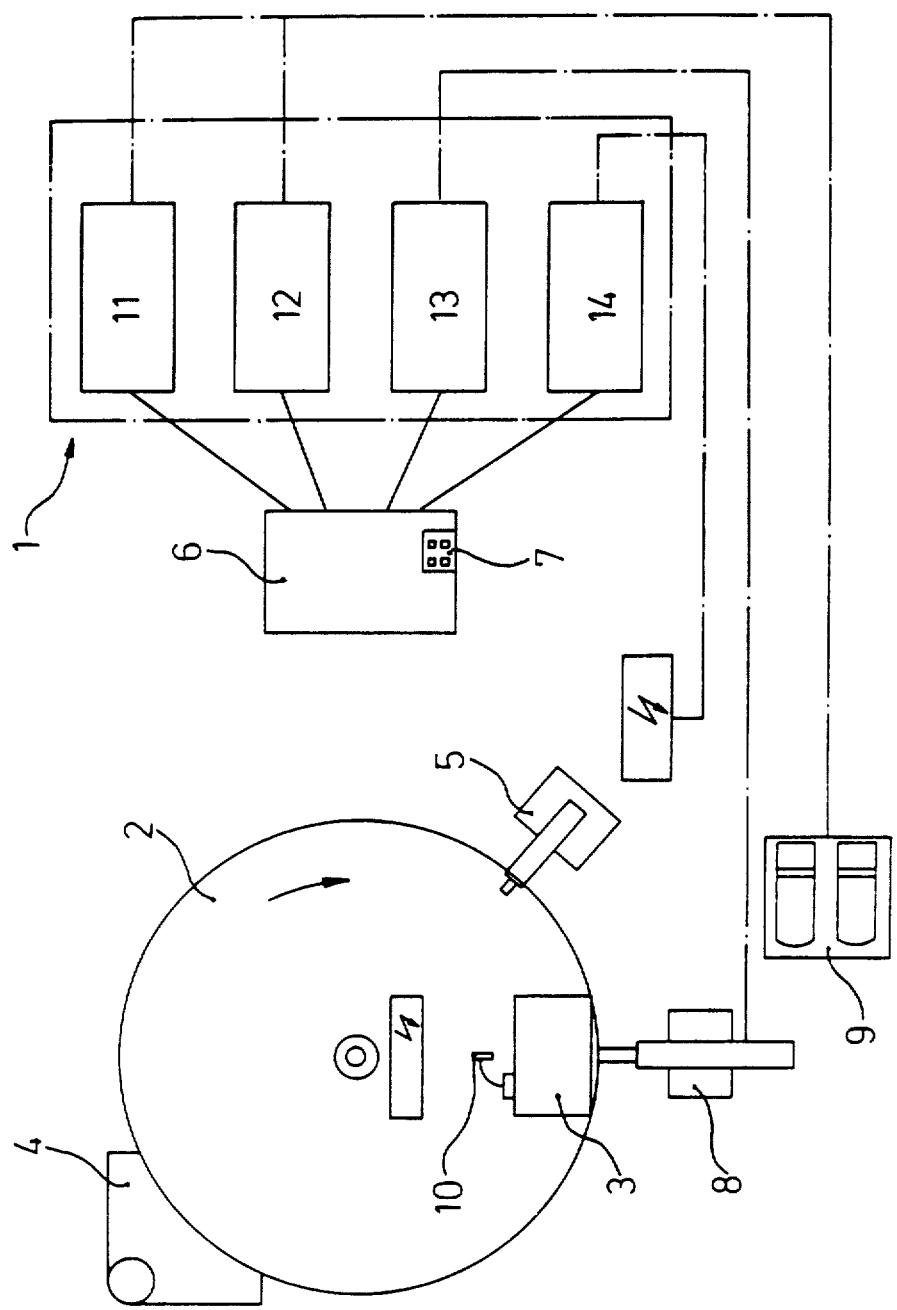

PROGRAM-CONTROLLED APPARATUS FOR THE PRODUCTION OF MOLDINGS FROM MULTICOMPONENT PLASTIC, IN PARTICULAR POLYURETHANE

BACKGROUND OF THE INVENTION AND PRIOR ART

The present invention relates to an apparatus for the production of moldings from multicomponent plastic, in particular polyurethane, this apparatus comprising a conveyor which mounts a plurality of interchangeable molds to be filled, a mixing unit for filling the molds, a mold release unit and a program control unit for controlling the conveyor, the mixing unit and the mold release unit.

The very large variety of such apparatuses are known. The conveyor is frequently a continuous conveyor in the form of a rotary table. The molds are filled at the mixing apparatus and emptied at the mold release unit. The latter is referred to as the robot. The molds must be exchangeable so that the apparatus can be used universally for the production of a very wide variety of moldings. The filling parameters, such as filling time, mixing ratio, mixing head setting and, where relevant, parting agent feed, must be reset for each mold. This is done by program control. Hence, for each mold there is a particular program which has to be selected in the appropriate computer for the mold mounted on the conveyor. In practice, an incorrect selection is frequently made, ie. the program selected is not intended for the mold present on the conveyor. This leads to incorrect operation and to rejects.

OBJECT AND SUMMARY OF THE INVENTION

It is an object of the present invention to provide an apparatus of the type stated at the outset in which incorrect operation as a result of incorrect program selection is avoided.

I have found that this object is achieved if the apparatus also comprises a plug individual to each mold and connecting the associated mold with the program control unit, the plug having contacts which set up a code characteristic of the associated mold, and a decoder associated with the control unit, the decoder being responsive to the code for controlling the control unit to perform the program corresponding to the code.

According to the invention, program selection no longer takes place in the computer but virtually at the mold itself. By setting and coding the plug contacts, a code is fixed which corresponds to the appropriate program. In the decoder connected appropriately to the program control, this code is then converted to an appropriate signal to control the computer according to the program. This eliminates incorrect operation since the mold itself selects the program through the setting of the contacts. Furthermore, operation is simple since the plugs need only be inserted mechanically into the appropriate socket on the conveyor, after which the entire production takes place automatically.

BRIEF DESCRIPTION OF THE DRAWING

An embodiment, shown schematically, is described with reference to a single FIGURE.

DETAILED DESCRIPTION OF THE PREFERRED EMBODIMENT

The apparatus, shown in plan view, consists of a control apparatus which in general is denoted by 1 and combines various functions.

The conveyor is in the form of a rotary table 2 possessing a drive 4. Various exchangeable molds 3 are arranged on the rotary table 2. Each mold is provided with a plug 10 which carries the coding cycles which can be set in a variety of ways. A mixing head is denoted by 8. This is supplied from a mixing apparatus 9 which Contains pumps, storage tanks, etc.

A mold release apparatus 5, referred to as a robot, removes the moldings from the mold and prepares them for the next shaping process. A parting agent can, if required, also be added here.

The program control unit 1 contains a decoder 6 and a program selector 7. As indicated schematically, these apparatuses control the foaming time (by means of unit 11), the mixing ratio (by means of 12), the mixing head setting and the subsequent mixing head program (by means of 13), the mold release apparatus and, where relevant, the parting agent feed (by means of 14), etc.

It can clearly be seen that, in this type of embodiment, it is virtually the mold itself which determines all the process steps required for producing its particular molding. Incorrect operation as a result of selecting the wrong programs cannot occur.

I claim:

1. Apparatus for the production of moldings from multicomponent plastic, in particular polyurethane, said apparatus comprising
   a conveyor which mounts a plurality of interchangeable molds to be filled,
   a mixing unit for filling the molds,
   a mold release unit, and
   a program control unit for controlling said conveyor, said mixing unit and said mold release unit,
   said apparatus also comprising
   a plug provided on and individual to each mold and connecting the associated mold with said program control unit, said plug having contacts which set up a code characteristic of the associated mold, and
   a decoder associated with said control unit, said decoder being responsive to said code for controlling said control unit to perform the program corresponding to said code.

* * * * *

UNITED STATES PATENT AND TRADEMARK OFFICE
CERTIFICATE OF CORRECTION

PATENT NO. : 4,720,253
DATED : Jan. 19, 1988
INVENTOR(S) : Gerhard KOENTGES

It is certified that error appears in the above-identified patent and that said Letters Patent are hereby corrected as shown below:

On the title page Insert

-- [30] Foreign Application Priority Data
Feb. 15, 1985 [DE] Fed.Rep.of Germany 3505155 --

Signed and Sealed this

Fifth Day of July, 1988

*Attest:*

DONALD J. QUIGG

*Attesting Officer*  *Commissioner of Patents and Trademarks*